(12) United States Patent
Golubkov

(10) Patent No.: US 10,340,566 B2
(45) Date of Patent: Jul. 2, 2019

(54) BATTERY MODULE

(71) Applicant: Samsung SDI Co., Ltd., Yongin-si, Gyeonggi-do (KR)

(72) Inventor: Andrej Golubkov, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 63 days.

(21) Appl. No.: 15/800,832

(22) Filed: Nov. 1, 2017

(65) Prior Publication Data
US 2018/0123200 A1   May 3, 2018

(30) Foreign Application Priority Data

Nov. 1, 2016   (EP) ..................................... 16196688

(51) Int. Cl.
| | |
|---|---|
| *H01M 10/6561* | (2014.01) |
| *H01M 10/613* | (2014.01) |
| *H01M 2/10* | (2006.01) |
| *H01M 10/04* | (2006.01) |
| *H01M 10/42* | (2006.01) |
| *H01M 2/12* | (2006.01) |
| *H01M 10/6563* | (2014.01) |
| *H01M 10/6566* | (2014.01) |

(52) U.S. Cl.
CPC ..... *H01M 10/6561* (2015.04); *H01M 2/1077* (2013.01); *H01M 2/1252* (2013.01); *H01M 10/045* (2013.01); *H01M 10/4207* (2013.01); *H01M 10/613* (2015.04); *H01M 10/6563* (2015.04); *H01M 10/6566* (2015.04)

(58) Field of Classification Search
None
See application file for complete search history.

(56) References Cited

U.S. PATENT DOCUMENTS

| | | |
|---|---|---|
| 2002/0182474 A1 | 12/2002 | Saito |
| 2009/0035647 A1 | 2/2009 | Takagi |
| 2010/0003581 A1 | 1/2010 | Kawai |
| 2012/0196163 A1 | 8/2012 | Shimizu et al. |

FOREIGN PATENT DOCUMENTS

| | | |
|---|---|---|
| EP | 2 226 868 A1 | 9/2010 |
| JP | 4788646 B2 | 7/2011 |
| JP | 5331517 B2 | 8/2013 |
| KR | 10-0469039 B1 | 1/2005 |
| WO | WO 2009/128214 A1 | 10/2009 |

OTHER PUBLICATIONS

European Search Report in corresponding European Application No. 16196688.2-1360, dated Feb. 10, 2017, 5 pages.

*Primary Examiner* — Wojciech Haske
(74) *Attorney, Agent, or Firm* — Lewis Roca Rothgerber Christie LLP

(57) ABSTRACT

A battery module includes: a plurality of aligned battery cells; a cooling gas inlet for supplying cooling gas to the battery cells; and a cooling gas valve in the cooling gas inlet. Each of the battery cells includes a battery case configured to bulge in response to a second pressure in the battery case, an electrode assembly in the battery case, a cap assembly on the battery case, and a gas exhaust vent configured to rupture in response to a first pressure in the battery case that is higher than the second pressure. The cooling gas inlet is defined by first and second side walls. The first side wall is configured to deform in response to a bulged battery case, and the cooling gas valve is configured to change from an open position into a closed position due to the deformation of the first side wall.

20 Claims, 4 Drawing Sheets

BATTERY MODULE

CROSS-REFERENCE TO RELATED APPLICATION

This application claims priority to and the benefit of European Patent Application No. 16196688.2, filed on Nov. 1, 2016 in the European Patent Office, the disclosure of which is incorporated herein by reference in its entirety.

BACKGROUND

1. Field

Aspects of embodiments of the present invention relate to a battery module.

2. Description of the Related Art

A secondary (or rechargeable) battery differs from a primary battery in that it is designed to be repeatedly charged and discharged, while the latter provides an irreversible conversion of chemical to electrical energy. Low-capacity rechargeable batteries are used as power supplies for, as an example, small electronic devices, such as cellular phones, notebook computers, and camcorders, while high-capacity rechargeable batteries are used as power supplies for, as an example, hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery (e.g., of the electrode assembly) via an electrochemical reaction of the positive electrode, the negative electrode, and the electrolyte solution. The shape of the case, such as a cylindrical or rectangular shape, depends on the battery's intended purpose.

Rechargeable batteries may be used as part of a battery module formed of a plurality of unit battery cells (e.g., rechargeable unit battery cells) coupled to each other in series and/or in parallel to provide high energy density for, as an example, driving a motor of a hybrid vehicle. For example, a battery module may be formed by interconnecting electrode terminals of the plurality of unit battery cells, the number of unit battery cells depending on a desired amount of power, to provide a high-power rechargeable battery (e.g., a high-power rechargeable battery module) for, as an example, powering an electric vehicle.

To safely use the battery module, heat generated by the rechargeable batteries should be efficiently emitted, discharged, and/or dissipated. If the heat emission/discharge/dissipation is not sufficiently performed, a temperature deviation occurs between the unit battery cells and the battery module may be unable to generate a desired amount of power for, as an example, driving a motor. In addition, if the internal temperature of the battery module increases due to the heat generated by the rechargeable batteries, an abnormal operation condition of a unit battery cell may occur, thereby deteriorating charging and discharging performance of the rechargeable battery cells and shortening the life-span of the rechargeable battery cells.

A simple cooling system is air cooling, in which a coolant gas stream (or cooling gas stream), such as an air stream, is lead to the battery cells to discharge heat from the cells. In mobile applications, such as in a vehicle including a battery module, preconditioned air from a passenger compartment may be used to cool the battery cells. While the air passes along the battery cells to cool the cells, exhaust gases from the battery cells may mix with the air stream, especially if one or more of the battery cells are in an abnormal operation condition. Thus, backflow of the cooling gas mixed with the exhaust gases of the batteries into the passenger compartment should be avoided.

An example of such an abnormal operation condition is thermal runaway of a battery cell that may occur when a battery cell, such as a lithium ion cell, is significantly overheated or overcharged. Thermal runaway is caused by a self-accelerating chemical reaction inside the cell and produces large amounts of heat and gas until all available material is exhausted. Due to the large amounts of hydrogen and carbon monoxide in the produced gases, the produced gases may be toxic and flammable. Thus, these harmful combustion gases should be prevented from entering the passenger compartment via a cooling gas inlet.

WO 2009/128214 A1 discloses a battery pack using air cooling, in which active exhaust of gases emitted by the battery cells may mix with a cooling air flow that flows along the battery cells. In order to prevent uncontrolled flow of the exhaust gases, a covering member is arranged upstream of the battery cells in a cooling gas passage and is opened by the flow pressure of the cooling air flow. Thus, intrusion of exhaust gas in the cooling gas passage shall be avoided.

According to the prior art, blocking of the flow path of battery exhaust gases is sensitive to (e.g., reacts to) a cooling air flow but not to an abnormal operation condition of a battery cell. Thus, situations may occur in which exhaust gases of a battery cell are lead into a passenger compartment.

SUMMARY

Aspect of embodiments of the present invention overcome or mitigate at least some of the drawbacks of the prior art and to provide a method for preventing unwanted flow of exhaust gas when an abnormal operation condition of a battery cell occurs.

Further aspects and features of the present invention will be apparent from the dependent claims, the attached drawings, and/or the following description of the attached drawings.

According to a first embodiment of the present invention, a battery module includes a plurality of aligned battery cells, each of the battery cells including an electrode assembly accommodated in a battery case, a cap assembly on the battery case, and a gas exhaust vent. The battery module further includes a cooling gas inlet for supplying cooling gas into the battery module and a cooling gas valve (e.g., a coolant gas valve) in the cooling gas inlet. According to embodiments of the present invention, the battery case and, in some embodiments, each of the battery cases, is configured to bulge before gas is exhausted through the gas exhaust vent when the battery cell is in an abnormal operation condition. Further, a first side wall of the cooling gas inlet is configured to be deformed in response to a bulged battery case, for example, in response to any of the battery cases bulging, and the cooling gas valve is configured to be closed by the deformed side wall of the cooling gas inlet.

The battery cells, each including the battery case and the cap assembly, show a characteristic behavior in an abnormal operation condition during which a high amount of exhaust gas is produced, such as a thermal runaway condition. The gas exhaust vent of each battery cell is configured to open (e.g., to rupture) at a pressure inside the battery case. According to embodiments of the present invention, the gas exhaust vent is configured to open at a threshold pressure, and the battery case bulges at an inside pressure below the threshold pressure. The bulging of the battery case is utilized to operate the cooling gas valve.

Thus, by configuring the battery case of a battery cell to bulge during an abnormal operation condition, for example, by adapting the threshold pressure of the gas exhaust vent to the wall thickness of the battery case, by configuring a side wall of a cooling gas inlet to be deformed by the bulging battery case, for example, by adapting the material and the wall thickness of the side wall, and by configuring the cooling gas valve to be closed by the deformed wall, a new and reliable operating mechanism for closing a cooling gas valve in an abnormal operation condition is provided that is directly sensitive to (e.g., directly responds to) the abnormal operation condition of a battery cell.

The battery cells may be prismatic (or rectangular) battery cells; however, the present invention is not limited thereto. Further, the battery cells may be aligned (e.g., stacked) in a first direction and may be arranged in a housing of the battery module. The battery module housing may enclose a coolant gas flow passage along an outer surface of the case of at least one of the plurality of battery cells, for example, along an outer surface of each of the plurality of battery cells. The coolant gas flow passage is configured to guide the coolant gas flow along the battery cells in order to transport heat away from the battery cells (e.g., to cool the battery cells).

The coolant gas inlet is configured to lead (e.g., to direct) the coolant gas into the coolant gas flow passage and may be arranged in the battery module housing. In some embodiments, the coolant gas inlet is arranged adjacent to the plurality of battery cells in the first direction and is in close contact with (e.g., contacts) an outermost one of the battery cells. The cooling gas inlet is formed by a first side wall and a second side wall, and at least one of the first and second side walls faces a surface of the battery case of the outermost battery cell or is the surface of the battery case of the outermost battery cell. There may be a plurality of coolant gas inlets, for example, two coolant gas inlets, each positioned next to (e.g., adjacent) one of the two outermost battery cells of the cell stack. One or more of the coolant gas inlets may also be positioned between sub-stacks of battery cells and may include a plurality of coolant gas valves. The coolant gas valves may be positioned above each other in a flow direction of the coolant.

According to an embodiment of the present invention, the cooling gas valve is configured to allow a cooling gas through the cooling gas inlet in a first position (e.g., in an open position), during a normal operation condition of each of the plurality of battery cells. The cooling gas valve is configured to seal the deformed cooling gas inlet (e.g., the cooling gas inlet including the deformed first side wall) in a second position (e.g., in a closed position). For example, the cooling gas valve has a first (operating) position and a second (operating) position and is transferred from (e.g., changed or moved from) the first position to the second position by the deformation of the first side wall of the cooling gas inlet in response to a bulged battery case.

The transfer of the cooling gas valve may occur due to a mechanical interaction between the deformed or deforming first side wall and a part of the cooling gas valve. In some embodiments, the cooling gas valve is formed such that the deformation of the first side wall pushes the cooling gas valve from its first position into its closed second position. The deformation of the first side wall may occur due to it being in or coming into direct contact with a bulged battery case. The first side wall is configured to be deformed by the bulged battery case, for example, by having an appropriate wall thickness. In other embodiments, the deformation of the first side wall may occur due to the displacement of a battery cell due to contact with a bulged battery case of another battery cell. The first side wall is configured, for example, by having an appropriate wall thickness, to be deformed by the displaced battery cell, for example, by a battery cell tilting (or pushing) against the first side wall. The contact between the bulged battery cell and the displaced battery cell may be direct contact or may occur via a spacer positioned between neighboring ones of the battery cells.

In some embodiments, the cooling gas valve is swiveably attached to a second side wall of the cooling gas inlet opposite to the first side wall and is configured to swivel from the first position into the second position by the deformation of the first side wall. Thereby, the second side wall is configured to remain essentially non-deformed during an abnormal operation condition of a battery cell. According to such embodiments, the cooling gas valve includes at least one portion (e.g., a second portion) that extends towards the first side wall and is in close contact with the first side wall during a normal operation condition of the battery cells (e.g., within a distance corresponding to an expected deformation of the first side wall in response to a bulged battery case). As the first side wall deforms, it pushes against that portion and, thus, swivels the cooling gas valve from the first into the second position by providing a torque relative to the attachment point of the cooling gas valve on the second side wall. The second portion is, thus, an actuating portion configured to be pushed by the deformed first side wall and may be configured to allow a cooling gas flow to pass in each of its positions. The cooling gas valve further includes at least one other portion (e.g., a first portion) that is configured to allow the cooling gas flow to pass in the first position of the valve and to block the gas flow in the second position of the valve. This portion (e.g., the first portion) is configured change or move into the second position as the deformed first side wall pushes the other portion (e.g., the second portion).

According to some embodiments, the cooling gas valve has an L-shaped or substantially L-shaped cross section, with a longer first portion and a shorter second portion that form an angle greater than about 90°, for example, slightly greater than about 90°. A connection line of the first portion and the second portion, for example, the line at which the two portions meet, is swiveably attached to the second side wall of the cooling gas inlet opposite to the first side wall. When the coolant gas valve is in the first position, the first portion is substantially aligned with the second side wall and a peripheral edge of the second portion is positioned close to the first side wall. The cooling gas valve is configured to swivel about the connection line into the second position as the second portion is pushed by the deformed first side wall such that a peripheral edge of the first portion comes into contact with the first side wall.

For example, in the first position, the first portion is aligned substantially parallel to a flow direction of the coolant gas in the coolant gas inlet and the second portion is offset or slightly offset with respect to to the flow direction of the coolant gas (e.g., the second portion is aligned to form a small angle with a direction perpendicular to the flow direction of the coolant gas). In the second position, the first portion is aligned such that it crosses the flow direction of the coolant gas in the coolant gas inlet and a peripheral edge of the first portion contacts (or touches) the first side wall. In such embodiments, the first portion is configured to cover (e.g., extend across) the entire cross-section of the cooling gas inlet in the second position of the coolant gas valve. Of the substantially L-shaped cross section, the peripheral edges of the first portion and the second portion are defined as the outermost tip of the respective portion that is opposite to the connection line.

According to some embodiments, the first portion may include (or may be formed of) a solid metal sheet. The metal sheet may extend along the entire coolant gas inlet in a direction perpendicular to the drawing plane of the substantially L-shaped cross section. Thus, when the first portion extends from the connection line that is attached to the second side wall to the first side wall, the coolant gas inlet is blocked (e.g., the coolant gas stream cannot flow through the coolant gas inlet). Further, the second portion may include a perforation configured to allow a coolant gas to pass therethrough. For example, the second portion may include (or may be formed of) a metal sheet that includes the perforation for coolant gas flow passage. The perforation may be an internal perforation (e.g., the perforation may be surrounded by the second portion on all sides) or may be open at one edge of the second portion (e.g., the perforation may not be surrounded by the second portions on all sides). In the latter embodiment, the second portion may include a plurality of perforations and may also include one or more studs extending from the connection line towards the first side wall of the coolant gas inlet.

Further, a peripheral edge of the first portion and a peripheral edge of the second portion may touch (or contact) the deformed first side wall when the coolant gas valve is in the second position. Thus, the cooling gas valve is clamped in its second position and, thus, blocked of any further motion (e.g., the cooling gas valve is fixed in the second position). The valve can then not swivel back towards the first position and leakage of exhaust gas may be avoided. Further, in such embodiments, the first portion and the second portion are elastically connected. Thus, close contact of both peripheral edges with the first side wall can be ensured, while breakage of the coolant gas valve may be avoided. This elastic connection may be inherently realized by the material of the coolant gas valve or may be realized by the type of connection or connection line between the first and second portion. According to one embodiment, the first portion and the second portion are welded together.

Further, in such embodiments, the first portion and the second portion form an angle between about 90° and about 120°, in some embodiments, the angle may be between about 93° and about 110° or between about 95° and about 100°. Such angles prevent the second portion from becoming blocked between the first and second side wall of the coolant gas inlet in the first position and ensures the swiveling of the second portion and the coolant gas valve from the first to the second position. Further, when the angle is slightly greater than about 90°, the second portion may not be much larger than the width of the coolant gas inlet to have its peripheral edge in close contact with the first side wall when the cooling gas valve is in the first position. For example, the shorter the second portion is compared to the first portion, the smaller an angular displacement of the second portion must be for the peripheral edge of the first portion to contact the first side wall when the cooling gas valve is in the second position. For example, the first portion and the second portion function may be considered as levers with the connection line being the fulcrum.

Further, in such embodiments, a peripheral edge of the second portion has a friction-reduced portion to allow for easy swiveling of the cooling gas valve from the first position into the second position due to the deformation of the first side wall. The friction-reduced portion of the peripheral edge may be provided by a friction-reduced coating, ball bearings arranged at the peripheral edge of the second portion, and/or the peripheral edge of the second portion having a rounded shape.

The coolant gas valve may include an elastic element that is configured to maintain the first portion substantially aligned with the second side wall when the coolant gas valve is in the first position. This elastic element may be a spring (e.g., a spiral spring) arranged at the connection line between the first portion and the second portion.

In some embodiments of the battery module, a battery case of each of a plurality of aligned battery cells has a first wide, side surface opposite to a second wide, side surface, and the plurality of battery cells are aligned such that the wide, side surfaces of neighboring ones of the battery cases face each other. For example, the first direction (e.g., an arrangement direction) is a direction substantially parallel to a normal vector of the wide, side surfaces. The battery cells may have a top surface, a bottom surface opposite to the top surface, a first narrow, side surface, and a second narrow, side surface opposite to the first narrow, side surface. According to such an embodiment, a side wall of the cooling gas inlet faces one of the wide, side surfaces of the outermost one of the battery cases. In other embodiments, the side wall of the cooling gas inlet is formed by one of the wide, side surfaces of the outermost one of the battery cases. There may be a respective coolant gas inlet next to each of the outermost battery cells, or there may be a coolant gas inlet between two sub-stacks of battery cells. In the latter embodiment, there may be a plurality of coolant gas valves in the coolant gas inlet (e.g., two valves) arranged above each other (e.g., stacked on each other) and swiveably connected to opposing side walls of the coolant gas inlet. If a single battery cell enters a thermal runaway condition, only one of the side walls will deform, and thus, only one of the coolant gas valves will be actuated at a time.

According to such embodiments, the wide, side surfaces of the battery case of each of the plurality of battery cells are configured to bulge before gas is exhausted through the gas exhaust vent in an abnormal operation condition of the respective battery cell. For example, the wide, side surfaces of the battery cases are mechanical weak points of the battery cases and may be the only case surfaces to bulge in response to an increasing internal pressure.

Further, a shortest distance between the wide, side surfaces of neighboring ones of the battery cells is less than a maximal deflection of a bulged wide, side surface of a battery cell before gas is exhausted through the gas exhaust vent in an abnormal operation condition. The maximum deflection is the distance of an outermost point of a wide, side surface in a direction parallel to a normal vector of that surface before and after bulging of the wide, side surface. According to this embodiment, a bulging case may directly influence (e.g., may tilt) a neighboring battery cell or may directly deform a first side wall of a cooling gas inlet. Further, a peripheral edge of the second portion may be positioned at a height of a point of maximum deflection of the bulged wide, side surface of the battery cell. Thereby, the influence of the bulging battery case on the second portion of the coolant gas valve is maximized and, as the peripheral edge of the second portion actuates (e.g., tilts) the cooling gas valve, reliable tilting of the cooling gas valve occurs. The point of maximum deflection of the wide, side surface is usually positioned about halfway between the upper surface and the opposite bottom surface of the battery case.

Also, spacers may be arranged between the wide, side surfaces of neighboring ones of the battery cells. The spacer may be relatively mechanically stiff and, thus, may transfer the mechanical load of a bulging battery case onto a neighboring battery cell or a neighboring first side wall, for example, by tilting. Further, the spacers may have insulating surfaces to electrically insulate neighboring ones of the battery cells from each other. Further, the spacers may include a cooling gas flow channel for a coolant gas flow. The cooling gas flow channel(s) may be part of the coolant gas flow passage as discussed above.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
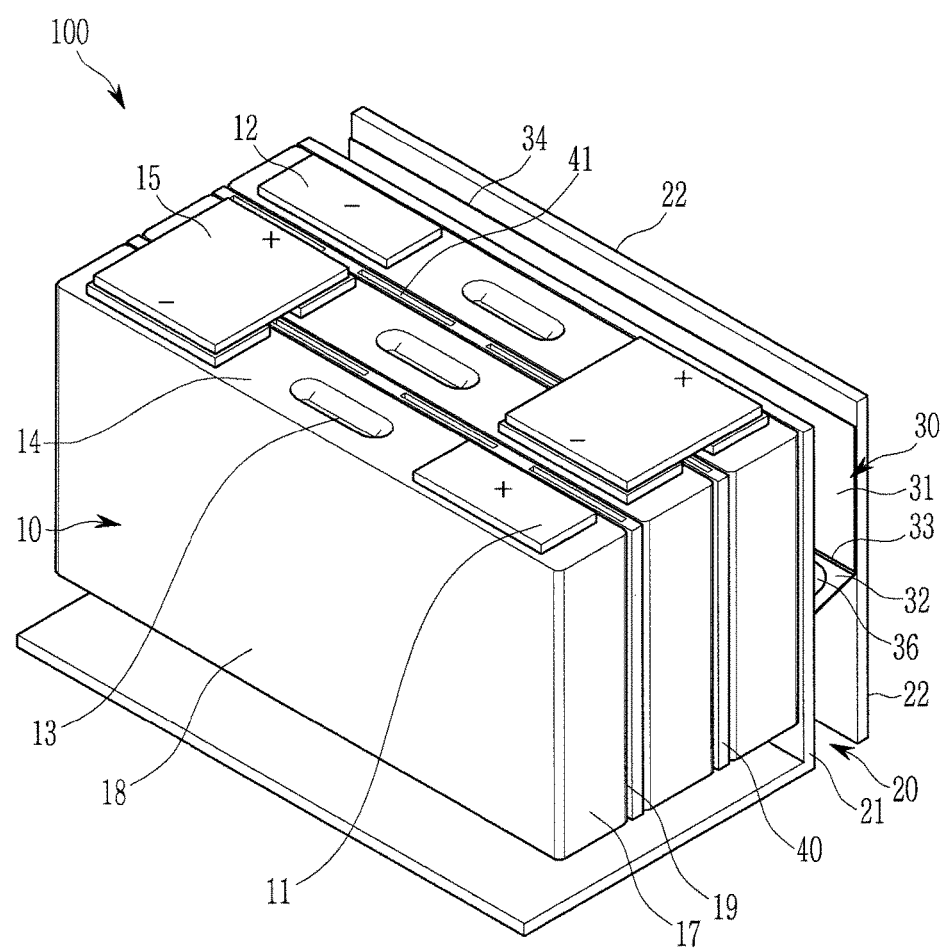
FIG. 1 is a perspective view of a battery module according to an embodiment.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Referring to FIG. 1, a battery module 100 according to an exemplary embodiment of the present invention includes a plurality of battery cells 10 arranged and aligned in a first direction. Each battery cell 10 is a prismatic (or rectangular) cell having wide, side surfaces 18, 19 that are stacked together to form the battery module 100. Further, each battery cell 10 includes a metal battery case 17 configured to accommodate an electrode assembly and an electrolyte. The battery case 17 is hermetically sealed by a cap assembly 14. The cap assembly 14 includes positive and negative electrode terminals 11 and 12 having different polarities and a gas exhaust vent 13. The gas exhaust vent 13 is a safety device of the battery cell 10, which acts as a passage through which gas generated in the battery cell 10 is exhausted to the outside of the battery cell 10. The gas exhaust vent 13 is configured to rupture at a threshold internal pressure, and the wide, side surfaces 18, 19 of the battery cells 10 are configured to bulge at an internal pressure lower than the threshold pressure at which the gas exhaust vent 13 ruptures. The positive and negative electrode terminals 11 and 12 of neighboring battery cells 10 are electrically connected to each other through bus bars 15. The battery module 100 may be used as power source unit by electrically connecting the plurality of battery cells 10 to each other as one bundle.

The battery cells 10 may generate a large amount of heat while being charged and/or discharged. The generated heat is accumulated in the battery cells 10, thereby accelerating deterioration of the battery cells 10. Therefore, the battery module 100 is provided with a coolant gas inlet 20 (e.g., a cooling gas inlet) that is arranged adjacent to an outermost battery cell 10 in the first direction. The coolant gas inlet 20 is at least partially formed by a first side wall 21 that faces the wide, side surface 19 of the outermost battery cell 10 and a second side wall 22 opposite to the first side wall 21. A coolant gas valve 30 (e.g., a cooling gas valve) is positioned in the coolant gas inlet 20. Rigid spacers 40 are interposed between adjacent ones of the battery cells 10, and each spacer 40 has a plurality of vertical cooling gas flow channels 41 (e.g., four vertical cooling gas flow channels 41). The battery cells 10 and the cooling gas inlet 20 are accommodated in a module casing (e.g., in a housing or battery module casing).

Figure 2:
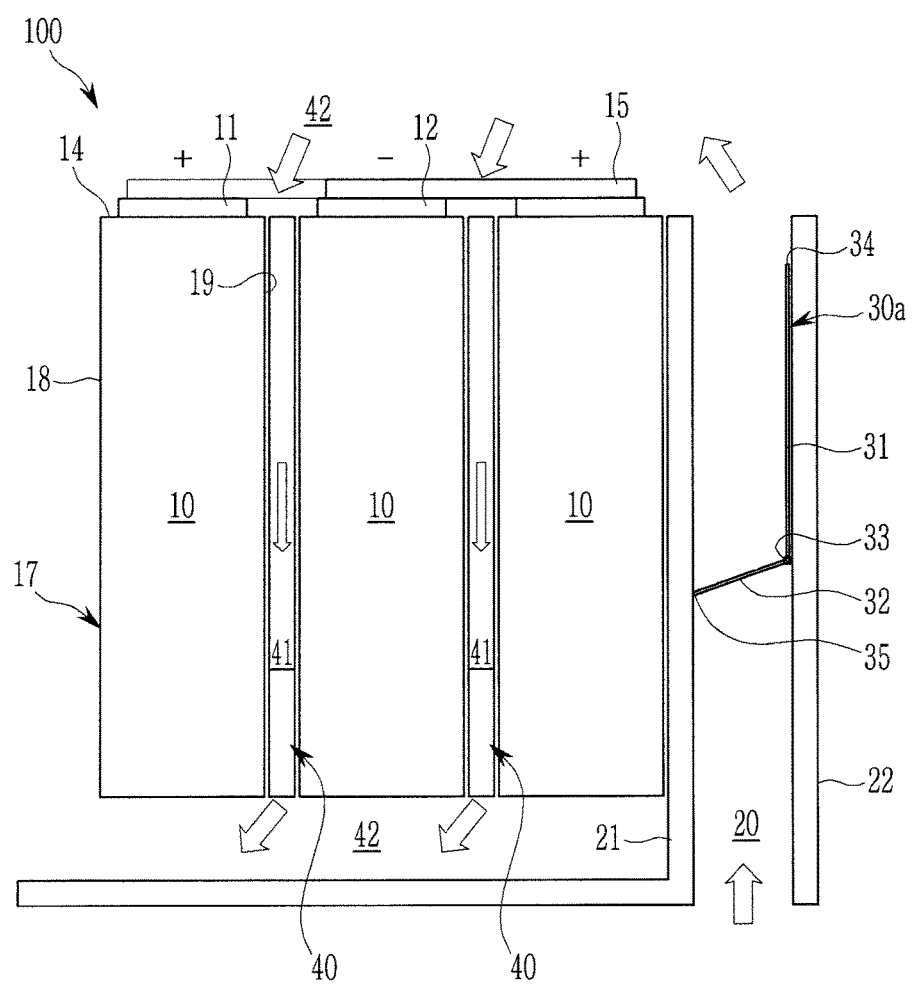
FIG. 2 is a cross-sectional view of the battery module shown in FIG. 1 during a normal operation condition of battery cells.

FIG. 2 is a cross-sectional view of the battery module 100 during a normal operation condition of the battery cells 10. The function of the cooling gas valve 30 during a normal operation mode of the battery cells 10 is further described below with respect to FIGS. 1 and 2.

The cooling gas valve 30 has a substantially L-shaped cross section and includes a first portion 31, which is, in some embodiments, made of a solid metal sheet, and a second portion 32, which is, in some embodiments, a metal sheet having an internal perforation 36 (e.g., an opening). The first portion 31 and the second portion 32 are welded together at a connection line 33 and together form an angle of approximately 100°. The cooling gas valve 30 is swiveably connected to (e.g., rotatably connected to) the second side wall 22 via the connection line 33. Therefore, the connection line 33 may include a bearing that houses a shaft and is attached to the second side wall 22 or vice versa. A spiral spring may be arranged in the bearing and configured to maintain the first portion 31 of the cooling gas valve 30 substantially parallel to the second side wall 22. When the cooling gas valve 30 is in a first position (e.g., an open position), a peripheral edge 35 of the second portion 32 is in close contact with the first side wall 21.

During a normal operation condition of each of the plurality of battery cells 10, cooling gas flow, such as preconditioned air flow from a passenger compartment of a vehicle, flows upwardly though the coolant gas inlet 20. The cooling gas passes (e.g., passes through) the second portion 32 of the cooling gas valve 30, which is in the first position, via the perforation 36. The cooling gas inlet 20 is continuous with (e.g., is in fluid communication with) a cooling gas passage 42, and the coolant gas passage 42 includes a first compartment above the battery cells 10 and a second compartment below the battery cells 10. From the coolant gas inlet 20, the coolant gas flows from the first compartment of the coolant gas passage 42 downwardly through the coolant gas channels 41 in the spacers 40 into the second compartment of the coolant gas passage 42. The heated coolant gas is then exhausted (e.g., exhausted from the battery module 100) via a gas exhaust in the lower left corner of the battery module housing. In FIG. 2, the coolant gas flow is indicated by arrows.

Figure 3:
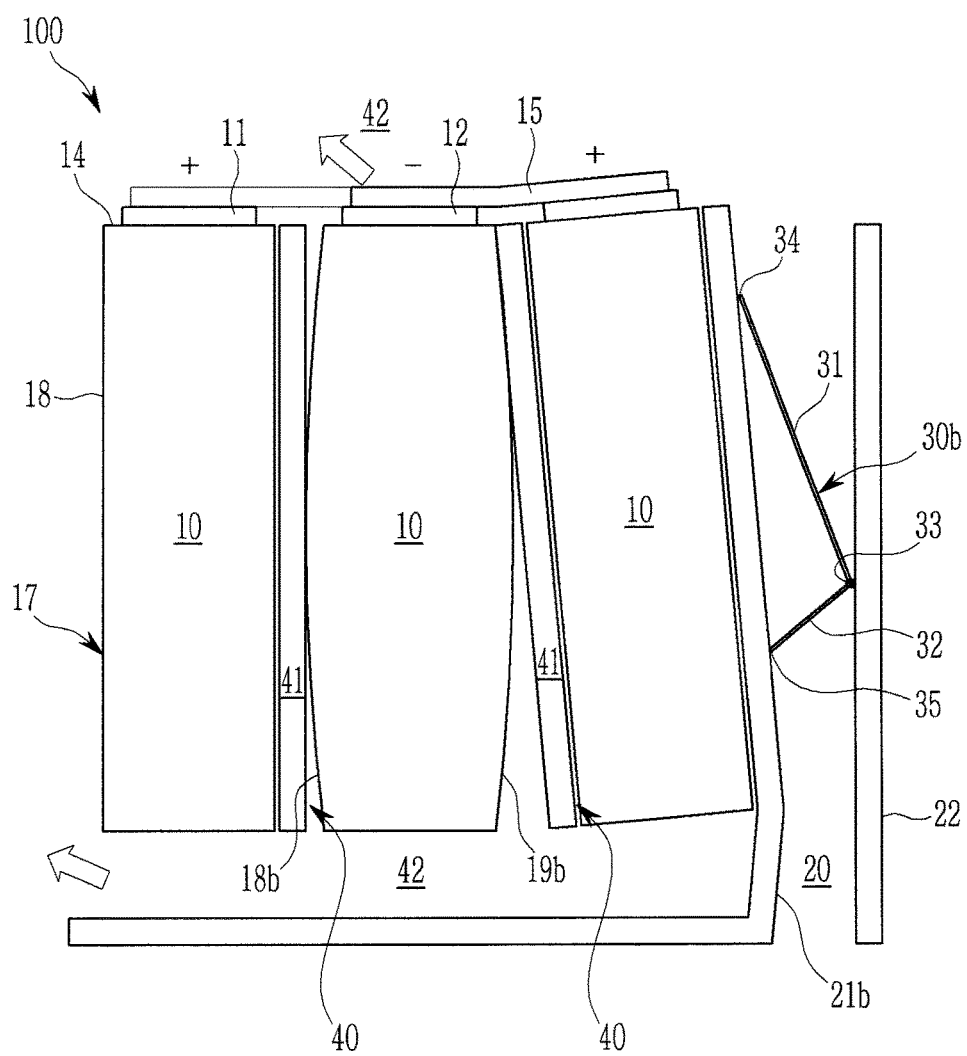
FIG. 3 is a cross-sectional view of the battery module shown in FIG. 1 during an abnormal operation condition of a first one of the battery cells.
Figure 4:
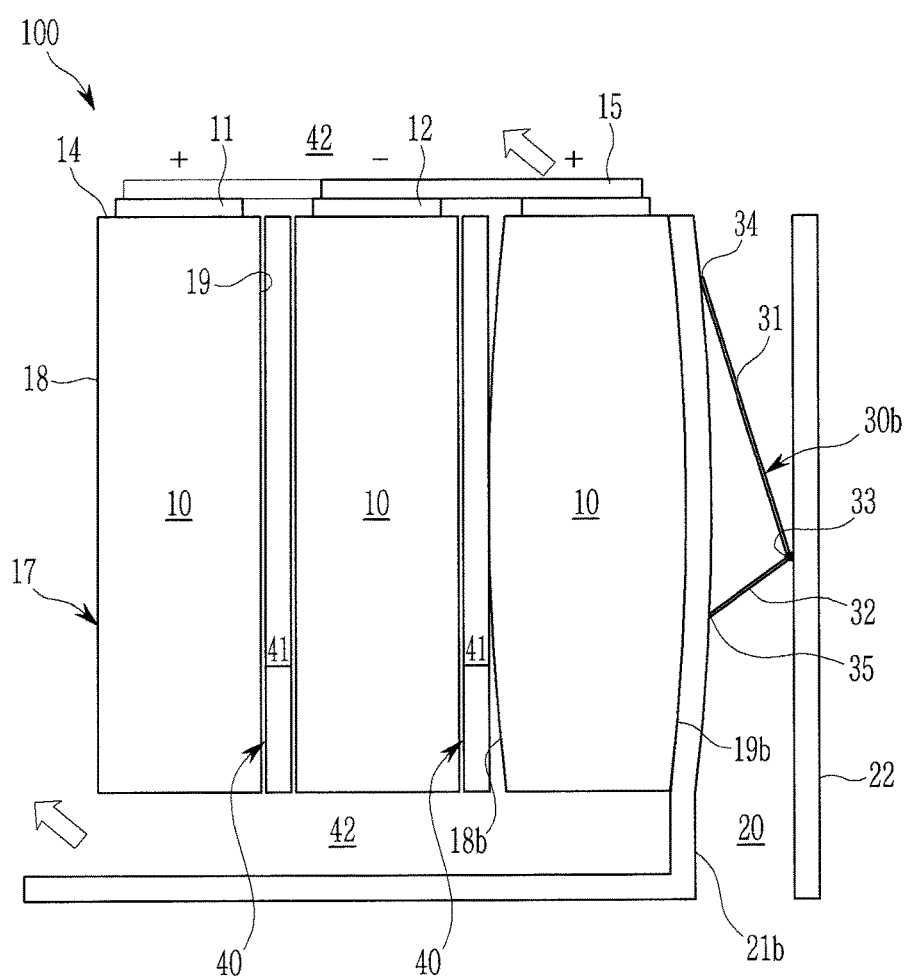
FIG. 4 is a cross-sectional view of the battery module shown in FIG. 1 during an abnormal operation condition of a second one of the battery cells.

FIG. 3 is a cross-sectional view of the battery module 100 during an abnormal operation condition of a first one of the battery cells 10, and FIG. 4 is a cross-sectional view of the battery module 100 during an abnormal operation condition of a second one of the battery cells 10. The function of the cooling gas valve 30 during an abnormal operation condition of the battery cells 10 is further described below with respect to FIGS. 3 and 4.

FIG. 3 shows a condition in which a central battery cell 10 in the middle of the plurality of battery cells 10 is in an abnormal operation condition, such as a thermal runaway condition. Due to an excessive amount of gas produced in the battery cell 10, the battery case 17 of the middle battery cell 10 bulges. For example, a first wide, side surface 18b and a second wide, side surface 19b of the central battery cell 10 are bulged with a maximum deflection or bulge being about halfway between a bottom of the battery case 17 and the cap assembly 14. Due to the bulged wide, side surfaces 18b, 19b, the rigid spacer 40 adjacent to the central battery cell 10 and an adjacent, outermost battery cell 10 are displaced, for example, are tilted, and deform the first side wall 21 of the coolant gas inlet 20.

FIG. 4 shows a condition in which the outermost battery cell 10 of the plurality of battery cells 10 is in an abnormal operation condition, such as a thermal runaway condition. Due to an excessive amount of gas produced in the battery cell 10, the battery case 17 of the outermost battery cell 10 bulges. The bulged wide, side surfaces 18b, 19b respectively face an inner one of the battery cells 10 and the first side wall 21 of the coolant gas inlet 20. The deflection of the first wide, side surface 19b directly deforms the first side wall 21 of the coolant gas inlet 20, with a maximum deflection or bulge being about halfway between the bottom of the battery case 17 and the cap assembly 14 of the outermost battery cell 10.

In both conditions illustrated in FIGS. 3 and 4, the deformed first side wall 21b pushes the peripheral edge 35 of the second portion 32 of the coolant gas valve 30 towards the second side wall 22 and, thus, swivels the coolant gas valve 30 from the first position (see FIG. 2) into a second position (e.g., a closed position) (see FIGS. 3 and 4). As the peripheral edge 35 is positioned approximately at the height of the maximum deflection of the first wide, side surface 19b of the bulged battery cell 10, the swiveling of the coolant gas valve 30 in response to the bulging of the battery cell 10 reliably occurs. In the second position, the peripheral edge 34 of the first portion 31 of the coolant gas valve 30 contacts the deformed first side wall 21b. The first portion 31, which is, in some embodiments, a solid metal sheet, extends along the entire length of the coolant gas inlet 20 in a direction perpendicular to the drawing plane of FIGS. 2-4. Thus, when the coolant gas valve 30 is in the second position (see FIGS. 3 and 4), the first portion 31 covers (or substantially covers) the entire cross section of the cooling gas inlet 20. If the internal pressure of the bulged battery cell 10 reaches a threshold pressure, the gas exhaust vent 13 ruptures and the exhaust gas is released into the coolant gas passage 42 (e.g., is released into the upper chamber of the coolant gas passage 42). Because the coolant gas inlet 20 is blocked by the coolant gas valve 30 being in the second position, the exhaust gas may only be discharged through the gas exhaust of the battery module casing, and backflow of the harmful exhaust gas into or through the coolant gas inlet 20, for example, into a passenger compartment of a car that is fluidly connected upstream to the coolant gas inlet 20, is prevented or substantially reduced. In FIGS. 3 and 4, the arrows indicate the flow direction of the battery exhaust gases.

Although exemplary embodiments of the present invention have been described herein, it is understood that the present invention should not be limited to these exemplary embodiments and that various changes and modifications can be made by one ordinary skilled in the art within the spirit and scope of the present invention. Hence, the scope of the present invention shall be determined at least by the technical scope of the accompanying claims and their equivalents.

SOME OF THE REFERENCE NUMERALS 100 battery module
10 battery cell 11 first terminal
12 second terminal
13 gas exhaust vent
14 cap assembly
15 bus bar
17 battery case
18 first wide, side surface
18b bulged first wide, side surface
19 second wide, side surface
19b bulged second wide, side surface
20 cooling gas inlet
21 first side wall
21b deformed first side wall
22 second side wall
30 cooling gas valve
31 first portion
32 second portion
33 connection line
34 peripheral edge of first portion (first peripheral edge)
35 peripheral edge of second portion (second peripheral edge)
36 perforation
40 spacer
41 cooling gas flow channel
42 coolant gas passage

What is claimed is:

1. A battery module comprising:
a plurality of battery cells aligned along a first direction, each of the battery cells comprising a battery case, an electrode assembly accommodated in the battery case, a cap assembly on the battery case, and a gas exhaust vent configured to rupture in response to a first pressure in the battery case, the battery case being configured to bulge in response to a second pressure in the battery case, the second pressure being lower than the first pressure;
a cooling gas inlet for supplying cooling gas to the battery cells, the cooling gas inlet being defined by a first side wall and a second side wall, the first side wall being configured to deform in response to a bulged battery case; and
a cooling gas valve in the cooling gas inlet, the cooling gas valve being configured to change from an open position into a closed position due to the deformation of the first side wall.

2. The battery module according to claim 1, wherein, in the open position when each of the battery cells is in a normal operation condition, the cooling gas valve is configured to allow a cooling gas to pass through the cooling gas inlet, and
wherein, in the closed position, the cooling gas valve is configured to seal the cooling gas inlet.

3. The battery module according to claim 1, wherein the cooling gas valve is swiveably attached to the second side wall of the cooling gas inlet opposite to the first side wall, and
wherein the cooling gas valve is configured to swivel from the open position into the closed position.

4. The battery module according to claim 3, wherein the second side wall is configured to remain non-deformed during an abnormal operation condition of one or more of the battery cells.

5. The battery module according to claim 1, wherein the cooling gas valve has an L-shaped cross section and comprises a first portion and a second portion that is shorter than the first portion, the first and second portions forming an angle greater than 90°,
wherein, in the open position, the first portion of the cooling gas valve is aligned with the second side wall and a peripheral edge of the second portion is near to the first side wall,
wherein a connection line between the first portion and the second portion is swiveably attached to the second side wall of the cooling gas inlet opposite to the first side wall, and
wherein the cooling gas valve is configured to swivel about the connection line from the open position into the closed position by the second portion being pushed by the deformation of the first side wall such that a peripheral edge of the first portion contacts the first side wall.

6. The battery module according to claim 5, wherein, in the closed position, the first portion covers the entire cross-section of the cooling gas inlet.

7. The battery module according to claim 5, wherein the first portion comprises a solid metal sheet.

8. The battery module according to claim 5, wherein the second portion comprises a perforation for letting a coolant gas pass therethrough.

9. The battery module according to claim 5, wherein, in the closed position, both a peripheral edge of the first portion and a peripheral edge of the second portion contact the deformed first side wall.

10. The battery module according to claim 5, wherein the first portion and the second portion are elastically connected to each other.

11. The battery module according to claim 5, wherein the first portion and the second portion form an angle between about 90° and about 120°.

12. The battery module according to claim 5, wherein a peripheral edge of the second portion has a friction-reduced portion.

13. The battery module according to claim 5, wherein the cooling gas valve comprises an elastic element configured to maintain the first portion aligned with the second side wall in the closed position.

14. The battery module according to claim 1, wherein the battery case of each of the battery cells comprises a first wide, side surface and a second wide, side surface opposite to the first wide, side surface,
wherein the battery cells are aligned such that the first and second wide, side surfaces of neighboring ones of the battery cases face each other, and
wherein one or both of the first and second side walls of the cooling gas inlet faces the outermost one of the first and second wide, side surfaces of an outermost one of the battery cells.

15. The battery module according to claim 14, wherein the first and second wide, side surfaces of the battery cases of each of the battery cells are configured to bulge before gas is exhausted through the gas exhaust vent in an abnormal operation condition of the respective battery cell.

16. The battery module according to claim 15,
wherein a shortest distance between adjacent ones of the wide, side surfaces of neighboring ones of the battery cells is smaller than a maximal deflection of a bulged one of the wide, side surfaces of the battery cell before gas is exhausted through the gas exhaust vent in the abnormal operation condition.

17. The battery module according to claim 14, further comprising spacers arranged between the wide, side surfaces of neighboring ones of the battery cells, each of the spacers comprising a cooling gas flow channel.

18. The battery module according to claim 1, wherein the battery case of each of the battery cells comprises a first wide, side surface and a second wide, side surface opposite to the first wide, side surface, wherein the battery cells are aligned such that the first and second wide, side surfaces of neighboring ones of the battery cases face each other, and wherein one or both of the first and second side walls of the cooling gas inlet is the outermost one of the first and second wide, side surfaces of an outermost one of the battery cells.

19. The battery module according claim 1, further comprising a coolant gas flow passage along an outer surface of the cases of the battery cells, wherein the cooling gas inlet is configured to direct the coolant gas into the coolant gas flow passage.

20. The battery module according to claim 1, wherein the cooling gas valve has an L-shaped cross section and comprises a first portion and a second portion that is shorter than the first portion, the first and second portions forming an angle greater than 90°, wherein, in the open position, the first portion of the cooling gas valve is aligned with the second side wall and a peripheral edge of the second portion is near to the first side wall, wherein a connection line between the first portion and the second portion is swiveably attached to the second side wall of the cooling gas inlet opposite to the first side wall, wherein the cooling gas valve is configured to swivel about the connection line from the open position into the closed position by the second portion being pushed by the deformation of the first side wall such that a peripheral edge of the first portion contacts the first side wall, and wherein the peripheral edge of the second portion is at a height of an area of maximum deflection of a bulged wide, side surface of the battery cell.

\* \* \* \* \*